(12) United States Patent
Fyke (10) Patent No.: US 8,581,850 B2
(45) Date of Patent: Nov. 12, 2013

(54) ADAPTIVE KEYBOARD WITH PHYSICAL FEEDBACK

(75) Inventor: Steven Henry Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 435 days.

(21) Appl. No.: 12/621,575

(22) Filed: Nov. 19, 2009

(65) Prior Publication Data
US 2011/0115710 A1     May 19, 2011

(51) Int. Cl.
    *G06F 3/02*     (2006.01)
    *G06F 3/048*     (2013.01)
    *G09G 5/00*     (2006.01)

(52) U.S. Cl.
    USPC .......................................... 345/169; 715/773

(58) Field of Classification Search
    USPC .................................................. 345/168, 169
    See application file for complete search history.

(56) References Cited

U.S. PATENT DOCUMENTS

| | | | |
|---|---|---|---|
| 7,170,428 B2* | 1/2007 | Himberg et al. ............... | 341/22 |
| 2004/0217939 A1 | 11/2004 | Levy | |
| 2004/0242283 A1* | 12/2004 | Flores ............................ | 455/566 |
| 2006/0176280 A1 | 8/2006 | Griffin | |
| 2007/0270178 A1* | 11/2007 | Sohn et al. ................ | 455/550.1 |
| 2009/0287769 A1* | 11/2009 | Kanda .......................... | 709/203 |

FOREIGN PATENT DOCUMENTS

| | | |
|---|---|---|
| EP | 1953782 | 8/2008 |
| WO | 2006007220 | 1/2006 |
| WO | 2007145423 | 12/2007 |
| WO | 2008014110 | 1/2008 |
| WO | 2008055513 | 5/2008 |

OTHER PUBLICATIONS

European Patent Office, Extended European Search Report for EP Patent App. No. 09176457.1, Mar. 31, 2010.
Canadian Patent Office, Office Action for CA Patent App. No. 2,709,606, Jun. 8, 2012.
European Patent Office, Examination Report for EP Patent App. No. 09176457.1, Apr. 10, 2012.

* cited by examiner

*Primary Examiner* — Nicholas Lee
(74) *Attorney, Agent, or Firm* — Borden Ladner Gervais LLP; Jeffrey W. Wong (57) ABSTRACT

The disclosure is directed at an adaptive keyboard having at least two key layouts, the adaptive keyboard for use with at least two applications, the keyboard comprising a processor for determining which of said at least two key layouts to display; a display portion having defined therein a set of keys, said display portion including a set of incisions thereby defining the keys; a set of actuators corresponding to each of the set of keys of the determined key layout; and a set of switches, each of the set of switches associated with at least one of the set of actuators.

18 Claims, 6 Drawing Sheets

ADAPTIVE KEYBOARD WITH PHYSICAL FEEDBACK

FIELD OF THE DISCLOSURE

The present disclosure relates generally to keyboards for mobile communication devices. More particularly, the present disclosure relates to an adaptive keyboard with physical feedback.

BACKGROUND OF THE DISCLOSURE

Mobile communication device use has grown and continues to grow with the continued implementation of new technologies. Due to this, mobile communication devices are continually being upgraded or improved. For instance, mobile communication devices now include touch screens, a camera or music playing functionality.

One part of the mobile communication device that has been upgraded over the years is the keyboard. Different types of keyboards are now available for different mobile communication devices. For instance, keyboards can be constructed from plastic keycaps and a rubber structure, and other styles are constructed from a thin sheet of metal or plastic with cut outs to allow the material to flex and actuate a switch. Other keyboards have a display material that can be cut into a number of shapes and sizes which are known in the art as an e-ink keyboard. An e-ink keyboard allows for the keyboard to provide different looks with respect to different functions or applications being executed. Finally, a third type of product has an active display based on organic light-emitting diodes (OLEDs) or LED technology that can display any image and may be embedded within physical keys or covered with a touch screen technology.

BRIEF DESCRIPTION OF THE DRAWINGS

Embodiments of the present disclosure will now be described, by way of example only, with reference to the attached Figures, wherein.

DETAILED DESCRIPTION

The current disclosure is directed at an adaptable keyboard with physical feedback for a mobile communication device. In one embodiment, there is provided a keyboard with an active display which can be updated through software to display and provide the necessary adaptive keyboard to a user. Cuts within the adaptive keyboard display provide the additional advantage of a dynamic keyboard having increased flexibility to improve tactile or physical feedback when the keys are depressed.

In a first aspect, the present disclosure provides an adaptive keyboard having at least two key layouts, the adaptive keyboard for use with at least two applications, the keyboard comprising: a processor for determining which of said at least two key layouts to display; a keyboard display portion having defined therein a set of keys, said keyboard display portion including a set of incisions thereby defining the keys; a set of actuators corresponding to each of the set of keys of the determined key layout; and a set of switches, each of the set of switches associated with at least one of the set of actuators.

In another aspect, there is provided an adaptive keyboard having at least two key layouts, for use with at least two applications, the keyboard comprising a keyboard display portion having defined therein a set of keys, said keyboard display portion including a set of incisions thereby defining the keys; whereby the location of the set of incisions provides distinct keys in each of the at least two key layouts such that a tactile feedback is experienced when the keyboard is in use.

Other aspects and features of the present disclosure will become apparent to those ordinarily skilled in the art upon review of the following description of specific embodiments of the disclosure in conjunction with the accompanying figures.

Generally, the present disclosure provides an adaptive keyboard for use with a mobile communication device which provides a physical or tactile feedback to a user when in use. An adaptive, or adaptable, keyboard is one that can switch between different modes, or key layouts, based on a user preference or on the application being executed. The provision of a tactile feedback for an adaptive keyboard allows a user to recognize when a key has been pressed to further improve use of the adaptive keyboard. By having tactile feedback, the user is also able to recognize when they have depressed a key. As will be understood, adaptive keyboards are dynamic and not static as their key layouts can be changed at any point.

Figure 1A:
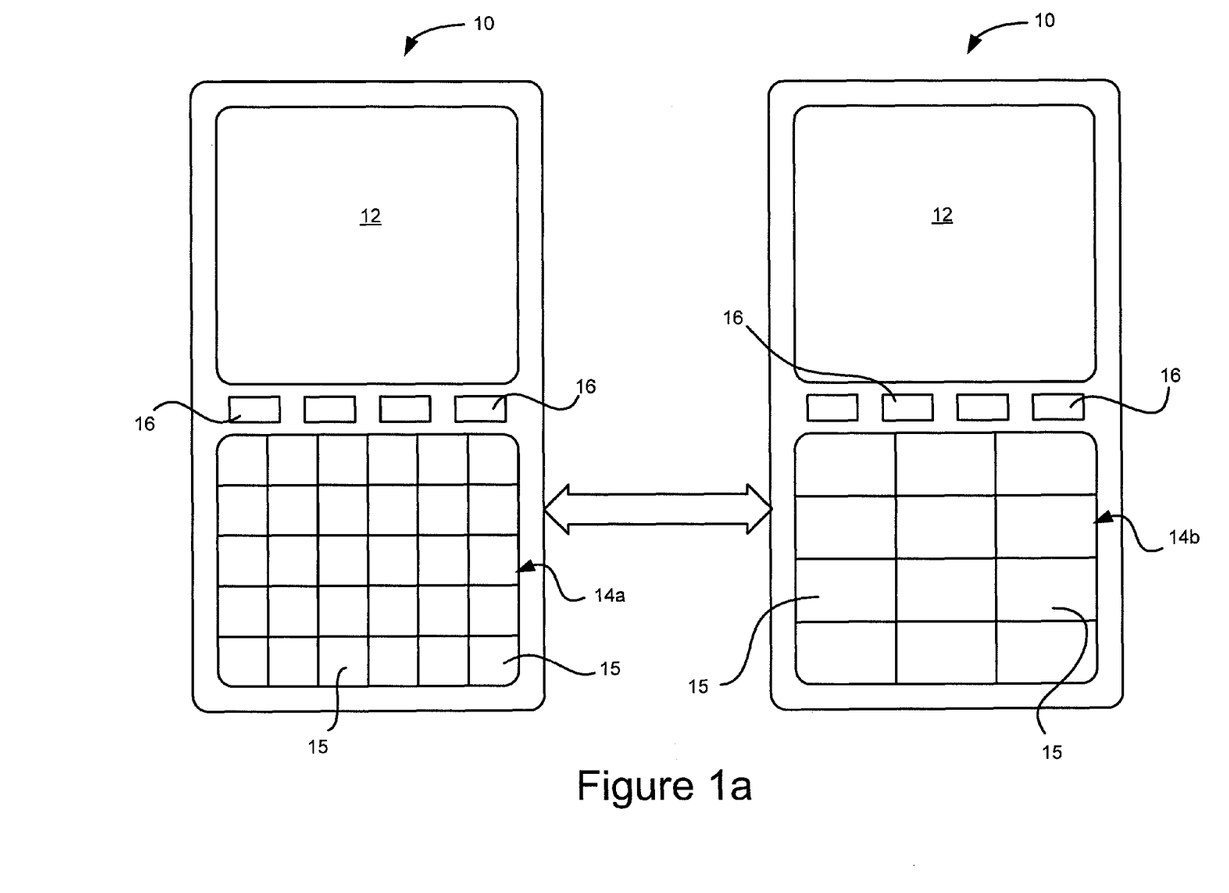
FIG. 1a is a schematic diagram of a mobile communication device having an adaptive keyboard.

Turning to FIG. 1a, schematic diagrams of a mobile communication device having an adaptive keyboard switching between two modes is shown. For example, the keyboard can be an e-ink type keyboard. The mobile communication device 10 includes a display 12 and an adaptive, or adaptable, keyboard 14 (FIG. 1b) whereby the adaptive keyboard can be used as a keyboard 14a or a keypad 14b depending on user preference or the application being executed on the mobile communication device 10. Each of the keyboard 14a and keypad 14b includes a set of keys 15 which include alphanumeric characters reflecting the alphabet character or number they represent. While this is not shown in FIG. 1a, this will be understood by one skilled in the art. The device 10 can also include a set of buttons 16 which can be used for various predetermined functionality. In an alternative embodiment, a trackball or similar device, such as an optical navigation module, can also be included to assist in mobile communication device navigation. Other functionality such as an On/Off button, input/output ports are not shown, however, one skilled in the art will understand that the mobile device 10 can include such functionality as well.

In a first use or mode, the adaptive keyboard 14 can be set and used as the keyboard 14a when the user is using an email or word processing application such that the keyboard 14a provides a QWERTY keyboard to the user. In a second mode, if the user switches to a phone application, the keyboard 14 can be adapted to provide the keypad 14b so that the user can dial a phone number. This switching between the two modes is schematically shown in FIG. 1, whereby the keyboard 14 can be switched between the alphabetical or an full alphanumeric keyboard 14a and the phone or numeric keypad 14b.

Figure 1B:
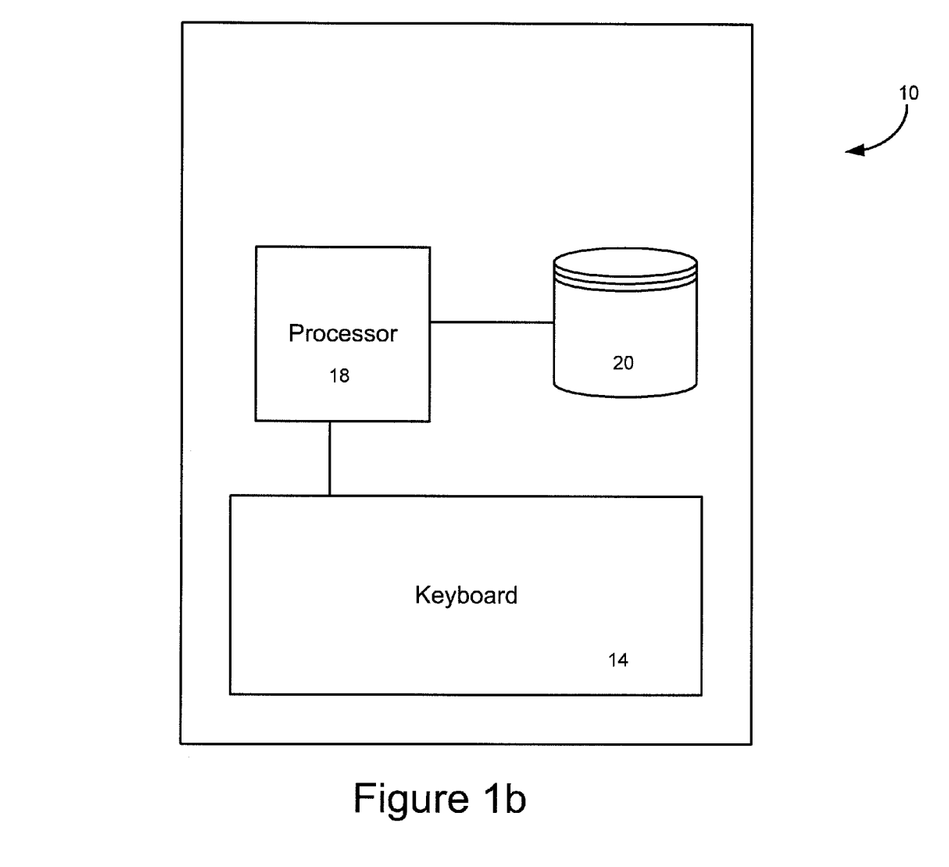
FIG. 1b is a schematic view of the mobile communication device.

Turning to FIG. 1b, a schematic view of the mobile communication device 10 is shown. The device 10 includes the adaptive keyboard 14, or keyboard display portion, which receives signals from a processor 18 which is also in communication with a database 20.

In one operational embodiment, when the user selects an application for execution, the processor 18 receives this selection and then determines whether the keyboard 14a or the keypad 14b, or any other key layout, is required for the application. This information can either be stored in the processor 18 or can be retrieved from the database 20. After determining the required keyboard 14a or keypad 14b, a signal is transmitted to the adaptive keyboard 14 to adjust accordingly so that the relevant keyboard 14 (i.e., keyboard 14a or keypad 14b) is displayed to the user. The processor 18 then executes the selected application.

Figure 2A:
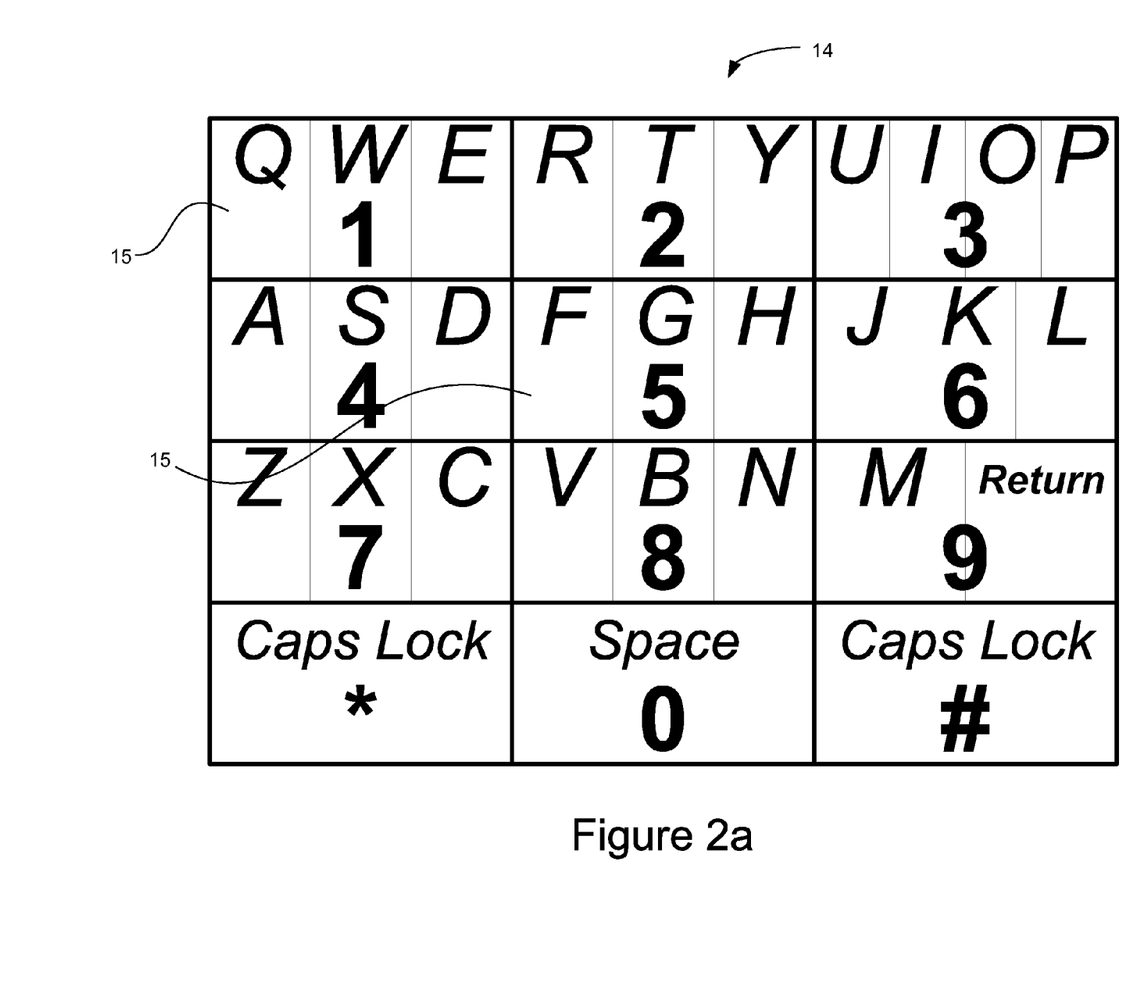
FIG. 2a is a front view of an adaptive keyboard with two sets of keys.

Turning to FIG. 2a, a schematic view of the adaptive keyboard 14 which can be used as either the phone keypad (12 keys) 14b or the full keyboard (30 keys) 14a is provided. As shown in FIG. 2a, the adaptive keyboard 14 includes the set of keys 15 which represent different characters depending on the application being executed on the mobile communication device 10. In this embodiment, the keyboard 14 can either be the keypad (numbers and characters in bold) 14b or the keyboard (letters in italics) 14a. It will be understood that the emphasis on the alphanumeric characters is for differentiating purposes and not meant to indicate the type of lettering being used. Depending on the implementation of the keyboard 14, the display of the lettering can be predetermined by the keyboard manufacturer and can be static whereby the lettering is constant (as shown) or can be dynamic such that the user only sees the lettering of the keyboard which is associated with the application being executed.

Figure 3:
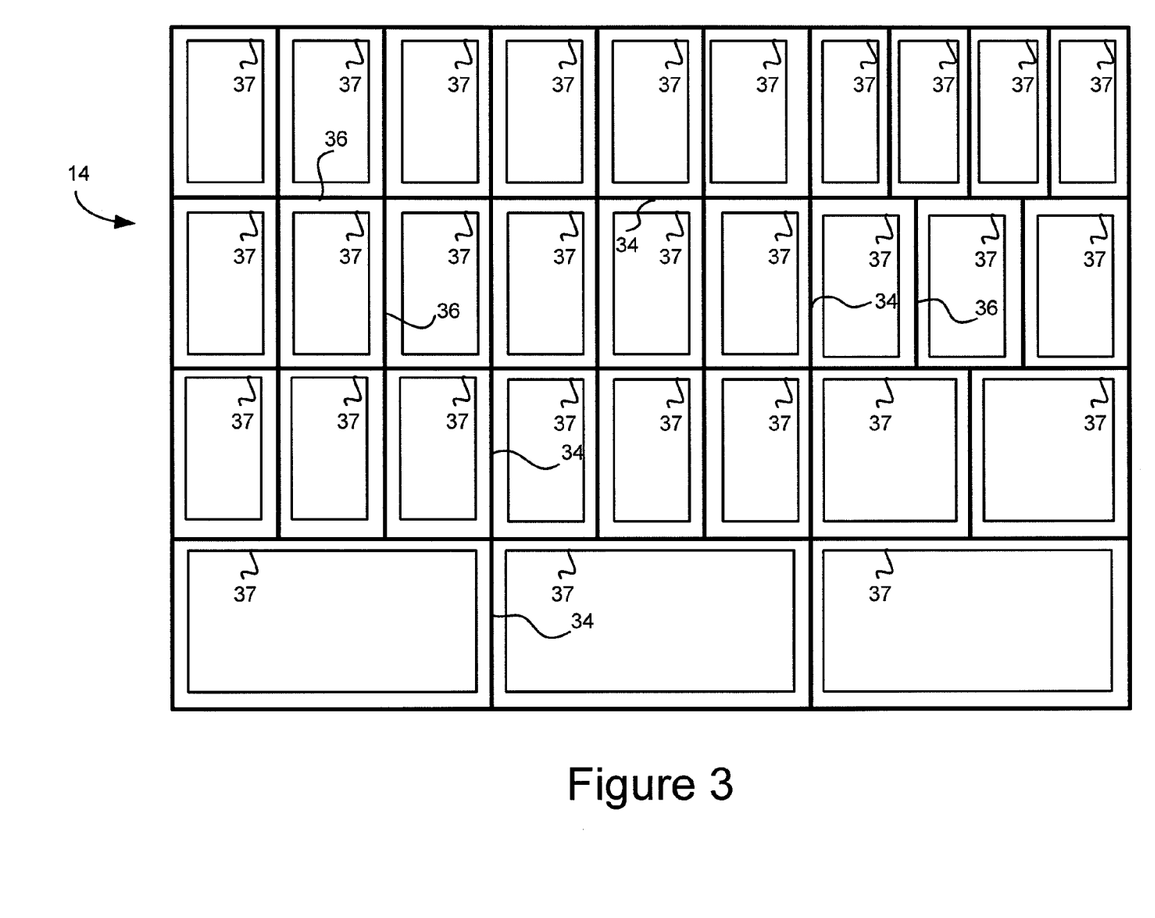
FIG. 3 is a rear view of the adaptive keyboard showing incision lines.

In order to provide an adaptive keyboard with a tactile feel, a number of incisions, or cut outs, identified herein as reference numbers 34, 36, are defined in the keyboard 14 (as shown in FIG. 3) to define keys 15. The locations of the cutouts 34, 36 are selected so that the user experiences a tactile feedback regardless of the mode the keyboard 14 is operating under. In the current embodiment, some of the numeric and alphabetical keys share common borders or lines as shown by the incisions 34 represented by thicker lines. For the individual alphabetical keys which do not share common borders with the keypad, these incisions 36 are shown in a thinner line. Alternatively, the keyboard 14 can include only the common incisions 34. In this alternative embodiment, when in the keyboard mode, some of the keys can have three positions reflecting the 3 alphabet letters, which would be understood in the art. In order to not affect operation of the device 10, the incisions 34 or 36 should not interfere with circuit traces 37 (located on a bottom surface of the keyboard) as the traces are for electrical connections to operate the keyboard and should not be compromised. In one embodiment, the traces travel parallel to the cuts 34, 36 without intersecting them. The design of the incisions 34, 36 and the traces is preferably determined by the keyboard manufacturer. Therefore, no matter which application is being executed on the device, the adaptive keyboard 14 can provide a tactile feel to the user when they are pressing the keys 15.

Figure 2B:
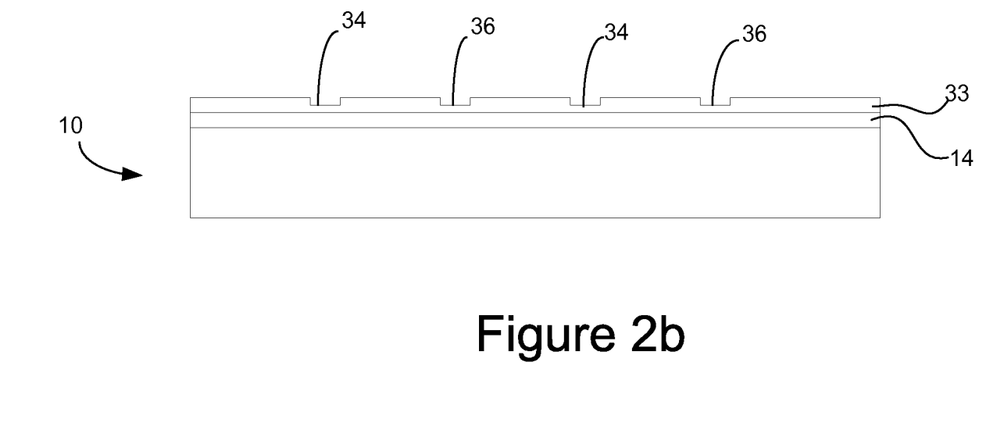
FIG. 2b is a side view of another embodiment of an adaptive keyboard.

In a further embodiment, as schematically shown in FIG. 2b, the keyboard display portion 14 can be covered by a cover portion 33. In this embodiment, the cover portion can include the incisions 34, 36 so that the user experiences a tactile feedback when using the adaptive keyboard. The cover portion 33 can also be a screen which changes depending if a keyboard 14a or keypad 14b is being displayed to the user.

Figure 4A:
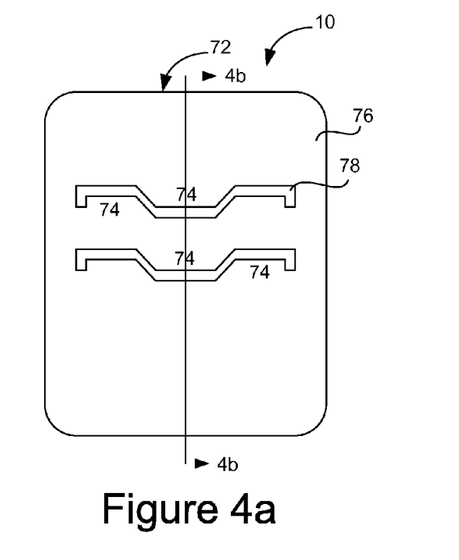
FIG. 4a is a front view of another embodiment of an adaptive keyboard in accordance with the disclosure.

Turning to FIG. 4a, a schematic diagram of an adaptive keyboard in accordance with an embodiment of the disclosure is shown. The mobile communication device 10 includes an adaptive keyboard 72 that includes a plurality of key locations 74. Depending on the application being executed on the communication device 10, the key locations can either be numeric or alphabetical keys (not shown), as described above with reference to keyboard 14a and keypad 14b. The keyboard 72 includes a keyboard display portion 76 which provides the adaptive keyboard to the user. In an alternative embodiment, a cover (not shown), preferably manufactured from a malleable material such as plastic or rubber, can be integrated with the display portion 76. Alternatively, in the case of an e-ink keyboard, the cover or display portion is formed from electronic paper within which cutouts or incisions 78 are made. The cutouts 34, 36 and 78 provide similar benefits to adaptive keyboard. The display portion 76 includes the plurality of cutouts 78 which allow the keyboard to be more flexible. The locations of the cutouts 78 are selected such that regardless of the application being executed, the adaptive keyboard or keypad being displayed to and used by the user provides a tactile feedback. Since the positioning or location of the keys for the various applications will be known to the keyboard manufacturer, the location of the cutouts 78 can be selected to be complementary for all applications. As will be understood, the selection of the locations for the cutouts 78 is dependent on the keyboard layouts that are available for the device or based on the applications supported by the device.

Figure 4B:
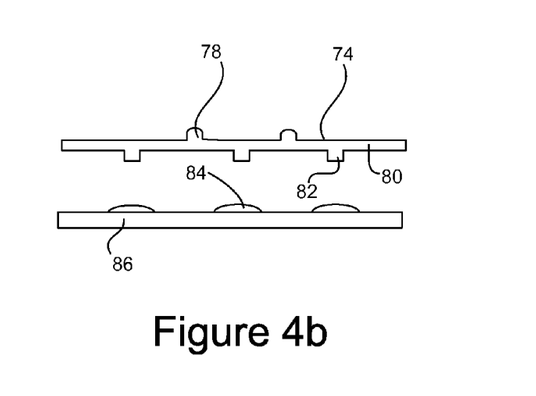
FIG. 4b is a cut away view taken along line 4b-4b of FIG. 4a and in the direction indicated.

Turning to FIG. 4b, the cutouts 78 are defined in the keyboard display portion 76 which can be a rubber layer 80. The rubber layer 80 provides a flexible membrane such that when the user depresses a key, there is a feedback to the user.

If there is a cover (not shown) placed over the rubber layer, the cutouts 78 in the cover can be filled by the rubber layer 80. Actuators 82, integrated within or moulded as a part of the rubber layer 80, are located on the opposite side from the display side of the keyboard and are used to actuate dome switches 84 located on a printed circuit board 86.

Each of the actuators 82 corresponds with one of a plurality of dome switches 84 located directly beneath the plurality, or set, of actuators 82 in actuator/switch pairs in the current embodiment. The implementation of the printed circuit board 86 and its interaction with the dome switches 84 will be understood by one skilled in the art. In this embodiment, the relationship between the set of actuators 82 and the set of dome switches 84 is a 1 to 1 relationship. Although only three actuators 82 and switches 84 are shown, it will be understood that any number of actuators 82 and switches 84 can be selected and is determined by the keyboard manufacturer. Dome-switch keyboards are a hybrid of membrane and mechanical keyboards which bring two circuit board traces together under a rubber "dome" or bubble. The inside of the top of the bubble is coated in graphite, although it is appreciated that other materials with similar properties may be suitable. When a key is pressed, it collapses the dome, which connects the two circuit traces and completes the connection to enter the character.

Depression of one of the keys 74 results in the associated actuator 82 contacting the corresponding dome switch 84, thereby causing a signal to be transmitted to the mobile communication device processor 18 indicating that a specific key has been selected. Operation of this aspect of a keyboard will be understood by one skilled in the art.

In one embodiment, the keyboard can include twelve actuators along with twelve switches so that one actuator/ switch pair corresponds with a key of the keypad 14b. For implementation of the keyboard, each of the actuator/switch pairs can be urged in multiple positions or directions to indicate different keys when a keyboard 14a is being provided.

Figure 4C:
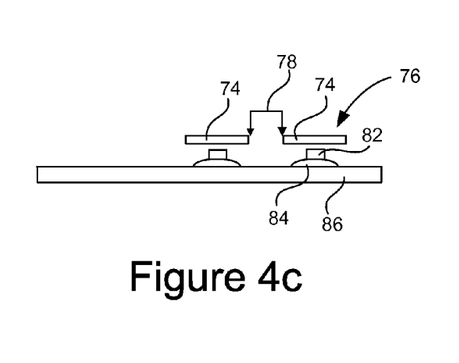
FIG. 4c is a cut away view of another embodiment taken along line 4b-4b of FIG. 4a and in the direction indicated.

Turning to FIG. 4c, in yet a further embodiment, the actuators 84 can be part of a dome sheet whereby the cover or display 76 has individual keys 74 which are separated by the incisions, or cutouts within the display portion 76 of the adaptive keyboard. In this embodiment, the actuators 82 are located on a surface of the individual domes 84 on the circuit board 86 which are then actuated by the key locations when they are depressed by a user.

Figure 4D:
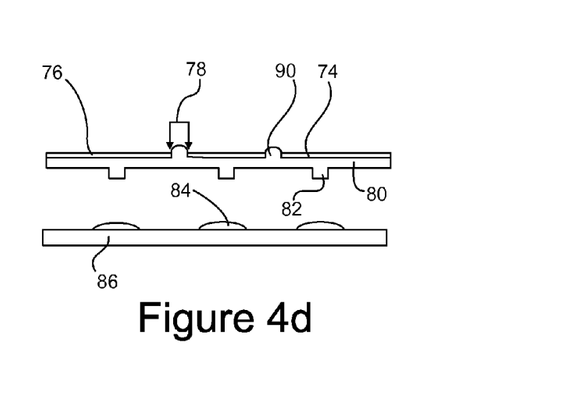
FIG. 4d is a cut away view of another embodiment taken along line 4b-4b of FIG. 4a and in the direction indicated.

Turning to FIG. 4d, yet a further embodiment of an adaptive keyboard is shown. The keyboard display portion 76 includes a plurality of cutouts 78, through which a plurality of protrusions 90 are housed. The protrusions 90 are part of a rubber layer 80 which underlies the keyboard display portion 76 and are used, in one embodiment, to serve as separators between keys. They can also provide flexibility to the keyboard. A set of actuators 82 are also located on a bottom side of the rubber layer 80 to actuate a set of switches 84 located on a circuit board 86.

As adaptive keyboards can be used for a plurality of applications, the locations of the incisions should be selected such that the tactile feedback can be provided to the user regardless of the application being executed. Therefore, unlike prior art keyboards with tactile feedback, there is a need to ensure the cutouts are satisfactory for more than one key layout. The present disclosure addresses this issue, in that the cutouts in the present disclosure are suitable for multiple keyboard layouts. For adaptive keyboards, there are at least two keyboard layouts which are available. They may or may not complement each other in a one-to-one relationship and therefore, current adaptive keyboards don't have any cutout portions since multiple key layouts are possible. The current disclosure is directed at an adaptive keyboard that includes cutouts which will complement any of the key layouts and therefore provide the tactile feedback that current adaptive keyboards do not. The provision of a tactile feedback provides a more familiar keyboard experience to a user when using an adaptive keyboard.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

1. An adaptive keyboard having at least two key layouts, the adaptive keyboard for use with at least two applications, the keyboard comprising:
    a keyboard display portion having defined therein a plurality of keys, said keyboard display portion including a set of incisions thereby defining the keys;
    a plurality of actuators, at least one actuator corresponding to each one of the keys of the determined key layout;
    a plurality of switches, each of the switches associated with at least one of the plurality of actuators; and
    a processor for determining which of said at least two key layouts to display on said keyboard display portion based on an application being executed;
    wherein each of the at least two key layouts contains a different number of keys; and
    wherein in one of the at least two key layouts a key defines two or more keys in another of the at least two key layouts.

2. The adaptive keyboard of claim 1 further comprising a database for storing relationships between applications being executed on the processor and the at least two key layouts.

3. The adaptive keyboard of claim 1 further comprising:
    a set of circuit traces located on a bottom surface of the keyboard display portion;
    wherein the set of incisions do not intersect the set of circuit traces.

4. The adaptive keyboard of claim 1 further comprising:
    a cover portion overlying the display portion and including a second set of incisions thereby defining the keys.

5. The adaptive keyboard of claim 4 wherein the cover portion is made from a resilient material.

6. The adaptive keyboard of claim 4 wherein the cover portion is a screen.

7. The adaptive keyboard of claim 1 wherein the keyboard display portion is made from a resilient material.

8. The adaptive keyboard of claim 1 wherein the incisions are cutout portions.

9. The adaptive keyboard of claim 8 further comprising a rubber layer underlying the keyboard display portion, the rubber layer including protrusions for filling the cutout portions within the keyboard display portion.

10. The adaptive keyboard of claim 1 wherein the keyboard display portion is made from electronic paper.

11. The adaptive keyboard of claim 4 wherein the cover portion is made from electronic paper.

12. An adaptive keyboard having at least two key layouts, for use with at least two applications, the keyboard comprising:
    a keyboard display portion having defined therein a plurality of keys, said keyboard display portion including a set of incisions;
    a processor for determining which of said at least two key layouts to display on said keyboard display portion based on an application being executed;
    a set of actuators corresponding to each of the set of keys of the determined key layout; and
    a set of switches, each of the set of switches associated with at least one of the set of actuators;
    wherein in one of the at least two key layouts a key defines two or more keys in another of the at least two layouts, and in each of the at least two key layouts a tactile feedback is experienced when the keyboard is in use; and
    wherein each of the at least two key layouts contains a different number of keys.

13. The adaptive keyboard of claim 12 further comprising a database for storing relationships between applications being executed on the processor and the at least two key layouts.

14. The adaptive keyboard of claim 12 further comprising:
   a set of circuit traces located on a bottom surface of the keyboard display portion;
   wherein the set of incisions do not intersect the set of circuit traces.

15. The adaptive keyboard of claim 12 wherein the keyboard display portion is made from a resilient material.

16. The adaptive keyboard of claim 12 wherein the incisions are cutout portions.

17. The adaptive keyboard of claim 16 further comprising a rubber layer underlying the keyboard display portion, the rubber layer including protrusions for filling the cutout portions within the keyboard display portion.

18. The adaptive keyboard of claim 12 wherein the keyboard display portion is made from electronic paper.

* * * * *

UNITED STATES PATENT AND TRADEMARK OFFICE
CERTIFICATE OF CORRECTION

| | | |
|---|---|---|
| PATENT NO. | : 8,581,850 B2 | Page 1 of 1 |
| APPLICATION NO. | : 12/621575 | |
| DATED | : November 12, 2013 | |
| INVENTOR(S) | : Steven Henry Fyke | |

It is certified that error appears in the above-identified patent and that said Letters Patent is hereby corrected as shown below:

Title Page, References Cited (56), under U.S. Patent Documents, add

--2008/0179173 A1* 7/2008 Jung et al.--
--7,808,486 B2* 5/2010 Griffin--
--2006/0024110 A1* 2/2006 Dombrowski et al.--

Signed and Sealed this
Twenty-fifth Day of March, 2014

Michelle K. Lee
*Deputy Director of the United States Patent and Trademark Office*